United States Patent Office 3,309,103
Patented Mar. 14, 1967

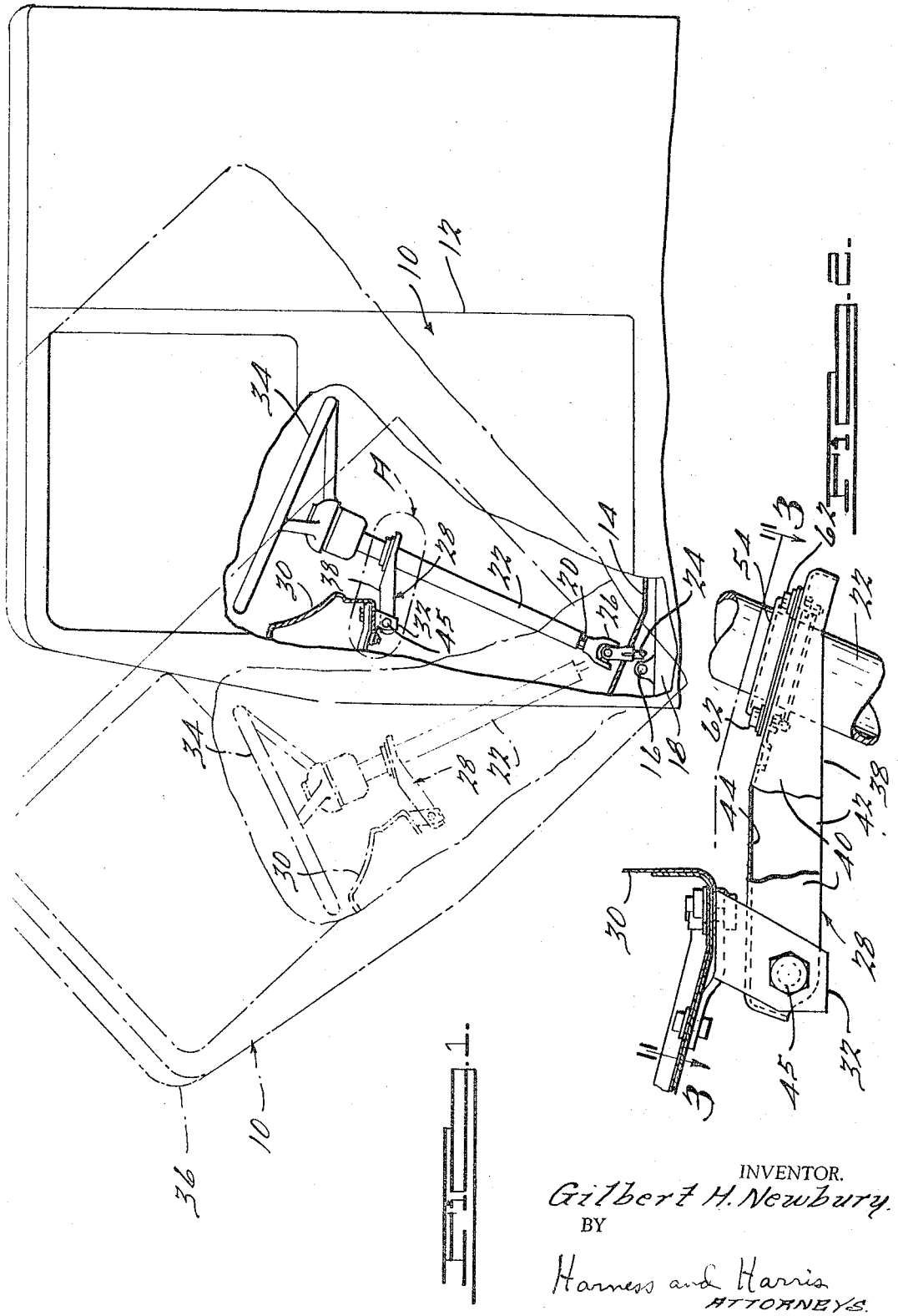

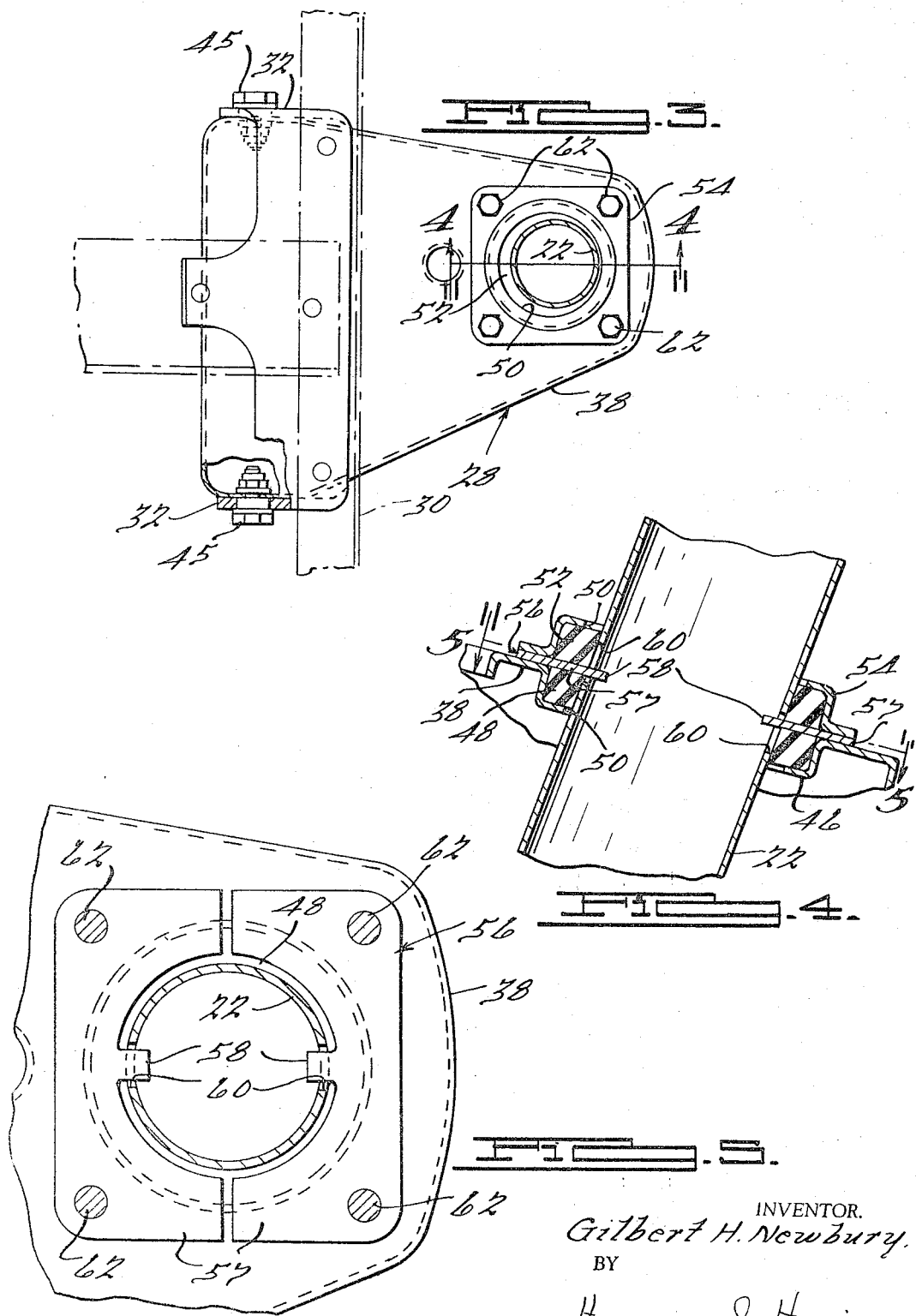

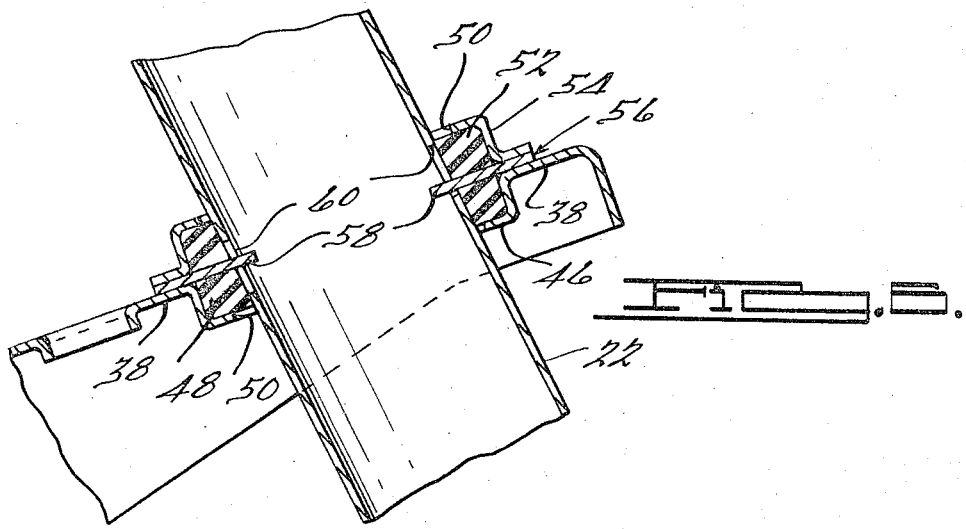
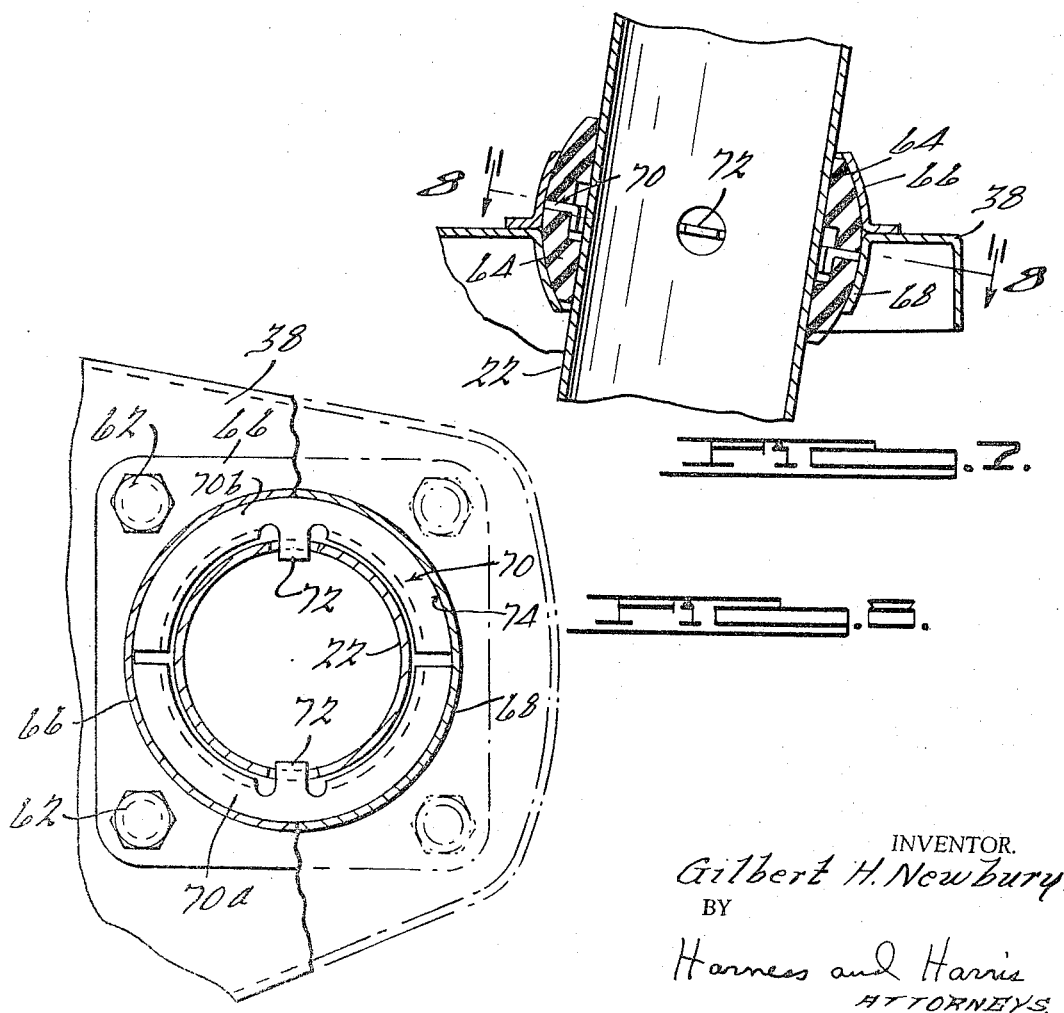

3,309,103
STEERING COLUMN SUPPORT MECHANISM
Gilbert H. Newbury, Utica, Mich., assignor to Chrysler Corporation, Highland Park, Mich., a corporation of Delaware
Filed July 7, 1965, Ser. No. 470,084
15 Claims. (Cl. 280—87)

This invention relates to a mechanism for supporting the steering column of a vehicle. More specifically, this invention relates to a support assembly for use in combination with a tiltable vehicular steering column wherein the support assembly must securely support the steering column and, yet, not interfere with its pivotal movement.

While the support mechanism of this invention may be used in any type of vehicle having a tiltable vehicular steering column, the problems associated with such a tiltable steering column are best evidenced in motor trucks of the tilting cab type in which the cab tilts forwardly about a laterally extending pivot axis located on the forward portion of the frame supporting the cab. Accordingly, for purposes of clarity and explanation, the following description of this invention will relate to the steering mechanism of a tilt cab truck wherein the steering gear assembly is fixedly mounted on the vehicle frame and the steering column is mounted within the cab and pivotally connected to the steering gear assembly so that it pivots with the cab when the latter is tilted.

Despite the wide use of tilt cab vehicles in the trucking industry, a persistent problem is presented in the design of such vehicles with respect to connecting the steering shaft to the steering gear assembly and to the cab. The problem stems from the fact that the steering shaft must generally be arranged so that it pivots about an axis which is in a different location from the pivot axis of the truck cab. Accordingly, the steering shaft necessarily travels through a different angle from the truck cab to which it is attached thereby preventing the steering shaft from being rigidly affixed to the cab. In order to meet this problem a number of approaches have been tried. Thus, one manufacturer has proposed that the problem be eliminated by locating the pivot point of the steering shaft on the pivotal axis of the cab. However, this solution in most instances is unacceptable, since it does not permit any freedom in the location of the steering gear assembly and, hence, there is little flexibility available in the design of the entire steering system. Another solution which has been offered is to mount the steering gear assembly, as well as the steering shaft, on the cab. This solution, however, requires the use of a series of expensive linkages to accommodate the movement of the gear assembly relative to the road wheels. Accordingly, in this approach, the problem has been merely transferred to another part of the steering system. Yet another approach to the problem has been to use a plurality of universal joints and splined shafts to connect the steering shaft to the reduction gear assembly. However, the cost of such an arrangement prevents its serious consideration in most applications.

In the present invention, the foregoing objections are eliminated by mounting the steering gear assembly on the frame and providing a steering shaft support assembly which enables the steering shaft to be secured to the cab and, yet, pivot about a point which is eccentrically disposed a substantial distance from the pivot axis of the cab.

A further object of this invention is to provide a support assembly for the steering shaft which will enable the steering shaft to rotate so as to facilitate the free unrestricted movement thereof throughout the tilting movement.

A still further object of the invention is to provide a steering shaft support means which will accommodate the use of a steering gear reduction unit and a steering shaft of conventional form, which will eliminate all preadjustments of parts prior to tilting, and which is designed for maximum dependability and economy.

Other objects and advantages of this invention will appear in the following description, which considered in connection with the accompanying drawings, set forth the preferred embodiments of the invention.

The term "transverse axis" as used in describing this invention refers to an axis which is substantially normal to the longitudinal axis of the vehicle.

In the drawings:

FIGURE 1 is a side elevational view of a portion of a tilt cab vehicle illustrating in solid lines the normal position of the cab and steering column, and in phantom lines the tilted position of the cab and steering column;

FIGURE 2 is an enlarged view of the steering column support assembly as illustrated in FIGURE 1, the portions thereof being indicated generally by the area designated as "A";

FIGURE 3 is a view partially in cross-section taken along the line 3—3 of FIGURE 2;

FIGURE 4 is a sectional view taken along the line 4—4 of FIGURE 3;

FIGURE 5 is a sectional view taken along the line 5—5 of FIGURE 4;

FIGURE 6 is a sectional view showing the relationship of the steering column and the column support bracket when the truck cab is in a fully tilted position as illustrated by the phantom lines of FIGURE 1;

FIGURE 7 is a sectional view showing a second embodiment of the column support bracket, the cab being in normal driving position; and FIGURE 8 is a sectional view taken along the line 8—8 of FIGURE 7.

Referring now to FIGURE 1, a cab 10 having a side panel 12 and a floor panel 14 is pivotally mounted on hinges or pivot pins 16 which are secured to the vehicle frame 18. Steering shaft 20, concentrically disposed within a steering column 22, is pivotally connected at its lower end to the steering gear assembly shaft 24 by a universal joint 26. The upper end of the steering column 22 is supported by a support assembly 28 which comprises support bracket 38 and bracket 32. Assembly 28 is affixed to the cab instrument panel 30 by means of the bracket 32. It is foreseeable that bracket 32 could be an integral part of the cab panel 30. A conventional steering wheel 34 is secured to the upper end of the steering shaft 20 adjacent the upper end of the steering column 22. Forward tilting of the cab 10, in which the steering column rotates fore and aft in a plane extending substantially longitudinally of the cab, carries the cab to the forward position shown by the phantom lines 36.

It can be seen from FIGURE 1 that the steering column 22 pivots about a point which is eccentrically disposed and is a substantial distance from the pivot axis of the cab compartment. While the pivotal universal joint 26 is illustrated as being above and to the rear of the pivot point 16 of the cab, it will be understood that the pivot point of the steering shaft may be positioned at any other location which may be a substantial distance from the pivot axis of the cab.

The operability of the arrangement described herein is attributable to the unique support assembly 28 which is shown in greater detail in FIGURES 2-6. Steering column 22 passes through a bracket 38 having two generally vertically disposed support portions 40 and 42 connected by a generally horizontal bridging portion 44. Bracket 38 is capable of limited pivotal movement in a direction substantially normal to a transverse axis of the cab due to its being pivotally connected at 45 to a second bracket 32 which is rigidly secured to a portion of the cab such as the instrument panel 30. Naturally, if desired, bracket 32 and 38 could be replaced by a single bracket of suitable design. As seen in FIGURE 4, bracket 38 has a downwardly depending recessed portion 46 with an aperture therein through which the steering column 22 can pass. A ring of resilient material 48 is supported by this recessed portion and this ring contacts the steering column 22 so as to prevent the steering column from touching the bracket 38 and so as to create a space 50 between the bracket 38 and the steering column 22. Another portion or ring of resilient material 52 extends above the bracket 38 and is held in contact with the steering column by a cap 54.

FIGURE 4 shows the relative positions of the steering column 22 and the bracket support assembly 38 when the cab is in a normal driving position, while FIGURE 6 illustrates such relative positions when the cab is in a fully tilted position. From these two figures it can be seen than steering column 22 rotates or swivels within the support bracket 38 in a plane which is substantially normal to a plane which is transverse to the cab, that is, a plane extending substantially longitudinally of the cab. Such rotation or swivel movement is achieved due to a limited pivotal movement of bracket 38 about bracket 32 and because the portions 48 and 52 of resilient material undergo simultaneous compression and expansion. Since steering column 22 is spaced, as indicated at 50, from the bracket 38 and cap 54, column 22 will pivot to a greater extent than the support assembly 28 and its pivotal movement will be controlled by the resilient deflectable material 48, 52.

In order to achieve proper pivotal motion of the steering column within the support bracket 38 it is necessary that the support bracket 38 not slide to any appreciable extent along the steering column and that the steering column be prevented from any substantial rotation about its longitudinal axis. Accordingly, a retainer 56 is provided which contacts or is mounted on or in the resilient material 48. Thus, retainer 56 may be embedded within the resilient material so that its upper and lower surfaces are in contact with the resilient material. Likewise, retainer 56 is detachably secured to the steering column 22 so as to be engageable therewith, as for example, by a key 58 adapted for insertion into an aperture 60 in the steering column 22, and is secured to the bracket 38 by bolt and nut fasteners 62. Of course, if a key 58 is employed, the aperture 60 in the steering column 22 must be dimensioned so that the steering column can rotate forwardly and rearwardly with respect to the retainer 56. As seen with reference to FIGURES 4, 5 and 6, the key 58 is not necessarily in contact with the steering column 22 thereby allowing the steering column to rotate or swivel. Bracket 38 is however, substantially precluded from sliding up or down the steering column since any such slight sliding motion will cause the key to engage the sides of the aperture 60. Any appreciable rotation of the steering column 22 about its longitudinal axis is likewise prevented. It will be appreciated that the aperture 60 could be dimensioned so that the key 58 would contact the vertical sides of the aperture thereby precluding any rotation of the steering column about its longitudinal axis. In order to more effectively limit the sliding motion of the bracket 38 relative to the steering column, it has been found that the retainer 56 should at least substantially, if not completely, surround the steering column and extend generally radially outward therefrom.

In order to facilitate the physical assembly of the support bracket 38 and installation thereof in a vehicle, a retainer 56 composed of two substantially C-shaped sections 57, 57 as illustrated in FIGURE 5, is preferred. Likewise, the resilient deflectable material 48 which may be a plastc, rubber or rubber-like material, may take the form of two annular shaped deflectable bushings spaced above and below retainer 56 and in contact therewith.

As mentioned above, the cap 54 maintains the resilient material 48, 52 compressed in bracket 38 and in contact with the steering column. Preferably, cap 54 has an upwardly depending portion which substantially, if not completely, surrounds steering column 20. As shown in FIGURES 3 and 5, cap 54 and retainer 56 can easily be secured to bracket 38. Preferably, both the cap and the retainer are detachably secured to the bracket by simple bolt and nut fastening means 62.

FIGURE 7 illustrates a second embodiment of the support bracket 38. In this embodiment, a bearing material 64, which may be fabricated from self-lubricating powdered metal or plastic, is secured to the steering column 22 by means of a cap 66 and a recessed portion 68 of bracket 38. Movement of steering column 22 during tilting of the truck cab results in the swiveling or oscillation of bearing material 64 about the arcuate retaining surfaces 66 and 68.

As seen in FIGURE 8, an annular shaped retainer 70 is provided so as to limit the longitudinal movement of bracket 38 relative to steering column 22. This retainer 70 is detachably secured to the steering column 22, as for example by an integral key 72 as described hereinabove. However, since the bearing means 64 is to rotate or swivel with the steering column 22, the retainer 70 is not rigidly connected to bracket 38. It will be appreciated that the outer peripheral edge 74 of retainer 70 need not contact the inner retaining surfaces of cap 66 and recessed portion 68 of bracket 38, but could be spaced slightly therefrom. The retainer 70 should, however, extend radially outward from steering column 22 a sufficient distance so that it will prevent, through engagement of the curved bearing retaining surfaces 66 and 68, bracket 38 from sliding any appreciable distance along the steering column 22. Again, in order to facilitate the physical assembly of the component parts of the support assembly, retainer 70 is preferably composed of two sections 70a, 70b as illustrated in FIGURE 8. Likewise, bearing material 64 may take the form of two metal or plastic deflectable bushings, one of which being located below and the other above the retainer 70.

The support assembly of this invention has been successfully used in a tilt cab truck in which the universal joint 26 was located approximately one-inch to the rear and three inches above the pivot axis of the cab. When the cab was tilted, the steering column thereof was carried through an angle of approximately 45° in a free unrestricted movement and without the development of interference or stresses that might result in fracture.

From the foregoing description it will be readily recognized that the cab tilting movement may be performed without manipulation or adjustment of the steering linkage, without preadjustment of the steering column and without removal of any portions of the cab floor. Furthermore, the support assembly of this invention is uncomplicated and economical to manufacture and install.

Although the foregoing description is necessarily of a detailed character in order that the invention may be completely set forth, it is to be understood that the specific terminology is not intended to be restrictive or confining, and that various rearrangements and modifications of detail may be resorted to without departing from the scope or spirit of the invention as claimed herein:

I claim:

1. In a vehicle having a tiltable steering column mounted in a passenger compartment, support means secured to an interior portion of said compartment and supportingly engaging said steering column, said support means comprising a support assembly having deflectable bushing means contacting said steering column and retainer means engageable with but normally spaced from said steering column so as to allow said steering column to swivel within said support assembly in a plane extending substantially longitudinally of said passenger compartment while limiting sliding axial motion of said support assembly relative to said steering column during tilting of said steering column.

2. In a vehicle having a tiltable steering column mounted in a passenger compartment, support means secured to an interior portion of said compartment and supportingly engaging said steering column, said support means comprising, a bracket pivotally connected to and extending outwardly from a portion of said compartment, said bracket having an aperture through which said steering column passes, deflectable bushing means contacting said steering column in the area where such column passes through said aperture so as to prevent said column from contacting said bracket, and retainer means engageable with but normally spaced from said steering column so as to allow said steering column to swivel within said support assembly in a plane extending substantially longitudinally of said passenger compartment while limiting sliding axial motion of said support assembly relative to said steering column during tilting of said steering column.

3. In a vehicle having a tiltable steering column mounted in a passenger compartment, support means secured to a portion of said compartment and supportingly engaging said steering column, said support means comprising a bracket pivotally connected to and extending outwardly from a portion of said compartment, said bracket having an aperture through which said steering column passes, deflectable bushing means contacting said steering column in the area where such column passes through said aperture so as to prevent said column from contacting said bracket, and retainer means engaging said bushing means and being engageable with but normally spaced from said steering column so as to allow said steering column to swivel within said support assembly in a plane extending substantially longitudinally of said passenger compartment while limiting sliding axial motion of said support assembly relative to said steering column during tilting of said steering column.

4. In a vehicle having a tiltable steering column mounted in a passenger compartment, support means secured to an interior portion of said compartment and supportingly engaging said steering column, said support means comprising a bracket pivotally connected to and extending outwardly from a portion of said compartment, said bracket having an aperture through which said steering column passes, deflectable bushing means contacting said steering column in the area where such column passes through said aperture so as to prevent said column from contacting said bracket, retainer means engaging said bushing means and being engageable with but normally spaced from said steering column so as to allow said steering column to swivel within said bracket in a plane extending substantially longitudinally of said passenger compartment while limiting sliding axial motion of said bracket relative to said steering column during tilting of said steering column, and cap means engaging the bushing means and being detachably secured to said bracket so as to maintain said bushing means in contact with said steering column.

5. In a vehicle having a tiltable steering column mounted in a passenger compartment, support means secured to an interior portion of said compartment and supportingly engaging said steering column, said support means comprising a bracket pivotally connected to and extending outwardly from a portion of said compartment, said bracket having formed therein a downwardly depending recessed portion having an aperture through which said steering column passes, deflectable bushing means contacting said steering column in the area where such column passes through said bracket so as to prevent said column from contacting said bracket, retainer means engaging said bushing means and being engageable with but normally spaced from said steering column so as to allow said steering column to swivel within said bracket in a plane extending substantially longitudinally of said passenger compartment while limiting sliding axial motion of said bracket relative to said steering column during tilting of said steering column, and cap means being detachably secured to said bracket and having a portion thereof projecting upwardly from said bracket, said upwardly directed portion engaging the bushing means so as to maintain said bushing means in contact with said steering column.

6. In a vehicle having a tiltable steering column mounted in a passenger compartment, support means secured to an interior portion of said compartment and supportingly engaging said steering column, said support means comprising a bracket pivotally connected to and extending outwardly from a portion of said compartment, said bracket having formed therein a downwardly depending recessed portion having an aperture through which said steering column passes, deflectable bushing means supported by said recessed portion and contacting said steering column in the area where such column passes through said bracket so as to prevent said column from contacting said bracket, retainer means substantially surrounding and extending generally radially outwardly from said steering column, said retainer means engaging said bushing means and being engageable with but normally spaced from said steering column so as to allow said steering column to swivel within said bracket in a plane extending substantially longitudinal of said passenger compartment while limiting sliding axial motion of said bracket relative to said steering column during tilting of said steering column, and cap means being detachably secured to said bracket and having a portion thereof projecting upwardly from said bracket, said upwardly directed portion engaging the bushing means so as to maintain said bushing means in contact with said steering column.

7. In a vehicle having a tiltable steering column mounted in a passenger compartment, support means secured to an interior portion of said compartment and engaging said steering column, said support means comprising a bracket pivotally connected to and extending outwardly from a portion of said compartment, said bracket having formed therein a downwardly depending recessed portion having an aperture through which said steering column passes of a diameter greater than that of the steering column, a first deflectable bushing supported by said recessed portion, retainer means disposed on an upper surface of said first bushing and at least substantially surrounding and extending generally radially outwarly from said steering column, said retainer means being engageable with but normally spaced from said column so as to allow said steering column to swivel within said bracket in a plane extending substantially longitudinally of said passenger compartment and so as to limit sliding axial motion of said bracket relative to said steering column during tilting of said steering column, a second deflectable bushing disposed on the upper surface of said retainer means, and cap means being detachably secured to said bracket and having a portion thereof projecting upwardly from said bracket, said upwardly directed portion engaging said second bushing so as to maintain said second bushing in contact with said steering column, said first and second deflectable bushings contacting said steering column in the area where such column passes through said bracket so as to prevent said column from contacting said bracket.

8. In a vehicle having a tiltable steering column mounted in a passenger compartment, support means secured to an interior portion of said compartment and engaging said steering column, said support means comprising a bracket pivotally connected to and extending outwardly from a portion of said compartment, said bracket having formed therein a downwardly depending recessed portion having an aperture through which said steering column passes of a diameter greater than that of the steering column, a first deflectable bushing supported by said recessed portion, a retainer disposed on an upper surface of said first bushing and having an aperture therein through which said steering column passes, said retainer being composed of two sections to facilitate mounting said retainer about said steering column, each section being engageable with but normally spaced from said steering column and said retainer at least substantially surrounding and extending generally radially outwarly from said steering column, a second deflectable bushing disposed on the upper surface of said retainer, and a cap means being detachably secured to said bracket and having a portion thereof projecting upwardly from said bracket, said upwardly directed portion substantially surrounding said steering column and engaging said second bushing so as to maintain said second bushing in contact with said steering column, said first and second bushings contacting said steering column in the area where such column passes through said bracket so as to prevent said column from contacting said bracket, and said retainer by virtue of being engageable with said column allowing said steering column to swivel within said bracket in a plane extending substantially longitudinal of said passenger compartment while limiting sliding axial motion of said bracket relative to said steering column during tilting of said steering column.

9. In a vehicle having a tiltable steering column mounted in a passenger compartment, support means secured to a portion of said compartment and engaging said steering column, said support means comprising a bracket pivotally connected to and extending outwardly from a portion of said compartment, said bracket having formed therein a downwardly depending recessed portion having an aperture through which said steering column passes of a diameter greater than that of the steering column, a first deflectable bushing supported by said recessed portion and having an aperture therein through which said steering column passes, a retainer disposed on an upper surface of said first bushing and having an aperture therein through which said steering column passes, said retainer being composed of two sections to facilitate mounting said retainer about said steering column, each section having a key adapted for insertion into an aperture in said steering column so as to render said section engageable with said column, said retainer at least substantially surrounding and extending generally radially outwardly from said steering column, a second deflectable bushing disposed on an upper surface of said retainer and having an aperture therein through which said steering column passes, and cap means being detachably secured to said bracket and having a portion thereof projecting upwardly from said bracket, said upwardly directed portion substantially surrounding said steering column and engaging said second bushing so as to maintain said second bushing in contact with said steering column, said first and second bushings contacting said steering column in the area where such column passes through said bracket so as to prevent said column from contacting said bracket, and said retainer by virtue of being keyed to said column allowing said steering column to swivel within said bracket in a plane extending substantially longitudinally of said passenger compartment while limiting sliding axial motion of said bracket relative to said steering column during tilting of said steering column.

10. In a vehicle having a tiltable steering column mounted in a passenger compartment, support means secured to a portion of said compartment and engaging said steering column, said support means comprising a bracket pivotally connected to and extending outwardly from a portion of said compartment, said bracket having formed therein a downwardly depending recessed portion having an aperture through which said steering column passes of a diameter greater than that of the steering column, a first resilient bushing supported by said recessed portion and having an aperture therein through which said steering column passes, a retainer disposed on the upper surface of said first bushing and having an aperture therein through which said steering column passes, said retainer being composed of two sections to facilitate mounting said retainer about said steering column, each section being detachably secured to said bracket and having a key adapted for insertion into an aperture in said steering column so as to render said section engageable with said column, said retainer at least substantially surrounding and extending generally radially outwardly from said steering column, a second resilient bushing disposed on an upper surface of said retainer and having an aperture therein through which said steering column passes, and a cap means being detachably secured to said bracket and having a portion thereof projecting upwardly from said bracket, said upwardly directed portion substantially surrounding said steering column and engaging said second bushing so as to maintain said second bushing in contact with said steering column, said first and second resilient bushings contacting said steering column in the area where said column passes through said bracket so as to prevent said column from contacting said bracket, and said retainer means by virtue of being keyed to said column allowing said steering column to swivel within said bracket in a plane extending substantially longitudinally of said passenger compartment while limiting sliding axial motion of said bracket relative to said steering column during tilting of said steering column.

11. In a vehicle having a tiltable steering column mounted in a passenger compartment, support means extending outwardly from a portion of said compartment and engaging said steering column, said support means comprising a first bracket rigidly secured to an interior portion of said compartment, a second bracket pivotally attached to said first bracket so as to pivot in a plane extending substantially longitudinally of said passenger compartment, said second bracket having first and second generally vertically disposed support portions and a generally horizontal bridging portion interconnecting said first and second support portions, said bridging portion having formed therein a downwardly depending recessed portion having an aperture through which said steering column passes of a diameter greater than that of the steering column, a first resilient bushing supported by said recessed portion and having an aperture therein through which said steering column passes, a retainer disposed on an upper surface of said first bushing and having an aperture therein through which said steering column passes, said retainer being composed of two sections to facilitate mounting said retainer about said steering column, each section being detachably secured to said second bracket and having a key adapted for insertion into an aperture in said steering column so as to render said section engageable with said column, said retainer at least substantially surrounding and extending generally radially outwardly from said steering column, a second resilient bushing disposed on an upper surface of said retainer and having an aperture therein through which said steering column passes, and a cap means being detachably secured to said second bracket and having a portion thereof projecting upwardly from said second bracket, said upwardly directed portion substantially surrounding said steering column and engaging said second bushing so as to maintain said second bushing in contact with said steering column, said first and second resilient bushings contacting said steering column in the area where said column passes through said second bracket so as to prevent said column from contacting said second bracket, and said retainer by virtue of being keyed to said column allowing said steering column to swivel within said bracket in a plane extending substantially longitudinal of said passenger compartment while limiting sliding axial motion of said second bracket relative to said steering column during tilting of said steering column.

12. In a vehicle having a passenger compartment tiltable about a pivot axis extending transversely of the vehicle, a steering column mounted in and movable with said tiltable compartment and a steering shaft concentrically disposed within said steering column, said shaft to pivot during tilting of said compartment about a pivot axis that extends transversely of the vehicle and is eccentrically disposed a substantial distance from the pivot axis of said compartment, support means secured to a portion of said compartment and engaging said steering column, said support means comprising a bracket pivotally connected to and extending outwardly from a portion of said compartment, said bracket having formed therein a downwardly depending recessed portion having an aperture through which said steering column passes of a diameter greater than that of the steering column, a first deflectable bushing supported by said recessed portion and having an aperture therein through which said steering column passes, a retainer disposed on an upper surface of said first bushing and having an aperture therein through which said steering column passes, said retainer being composed of two sections to facilitate mounting said retainer about said steering column, each section having a key adapted for insertion into an aperture in said steering column so as to render said section engageable with said column, said retainer at least substantially surrounding and extending generally radially outwardly from said steering column, a second deflectable bushing disposed on an upper surface of said retainer and having an aperture therein through which said steering column passes, and a cap means being detachably secured to said bracket and having a portion thereof projecting upwardly from said bracket, said upwardly directed portion substantially surrounding said steering column and engaging said second bushing so as to maintain said second bushing in contact with said steering column, said first and second bushings contacting said steering column in the area where such column passes through said bracket so as to prevent said column from contacting said bracket, and said retainer by virtue of being keyed to said column allowing said steering column to swivel within said bracket in a plane extending substantially longitudinally of said passenger compartment while limiting sliding axial motion of said bracket relative to said steering column during tilting of said steering column.

13. In a vehicle having a passenger compartment tiltable about a pivot axis extending transversely of the vehicle, a steering column mounted in and movable with said tiltable compartment, and a steering shaft concentrically disposed with said steering column, said shaft to pivot during tilting of said compartment about a pivot axis that extends transversely of the vehicle and is eccentrically disposed a substantial distance from the pivot axis of said compartment, support means secured to a portion of said compartment and engaging said steering column, said support means comprising a bracket pivotally connected to and extending outwardly from a portion of said compartment, said bracket having formed therein a downwardly depending recessed portion having an aperture through which said steering column passes of a diameter greater than that of the steering column, a first resilient bushing supported by said recessed portion and having an aperture therein through which said steering column passes, a retainer disposed on the upper surface of said first bushing and having an aperture therein through which said steering column passes, said retainer being composed of two sections to facilitate mounting said retainer about said steering column, each section being detachably secured to said bracket and having a key adapted for insertion into an aperture in said steering column so as to render said section engageable with said column, said retainer at least substantially surrounding and extending generally radially outwardly from said steering column, a second resilient bushing disposed on an upper surface of said retainer and having an aperture therein through which said steering column passes, and a cap means being detachably secured to said bracket and having a portion thereof projecting upwardly from said bracket, said upwardly directed portion substantially surrounding said steering column and engaging said second bushing so as to maintain said second bushing in contact with said steering column, said first and second resilient bushings contacting said steering column in the area where said column passes through said bracket so as to prevent said column from contacting said bracket, and said retainer means by virtue of being keyed to said column allowing said steering column to swivel within said bracket in a plane extending substantially longitudinally of said passenger compartment while limiting sliding axial motion of said bracket relative to said steering column during tilting of said steering column.

14. In a vehicle having a passenger compartment tiltable about a pivot axis extending transversely of the vehicle, a steering column mounted in and movable with said tiltable compartment, and a steering shaft concentrically disposed with said steering column, said shaft to pivot during tilting of said compartment about a pivot axis that extends transversely of the vehicle and is eccentrically disposed a substantial distance from the pivot axis of said compartment, support means extending outwardly from a portion of said compartment and engaging said steering column, said support means comprising a first bracket rigidly secured to an interior portion of said compartment, a second bracket pivotally attached to said first bracket so as to pivot in a plane extending substantially longitudinally of said passenger compartment, said second bracket having first and second generally vertically disposed support portions and a generally horizontal bridging portion interconnecting said first and second support portions, said bridging portion having formed therein a downwardly depending recessed portion having an aperture through which said steering column passes of a diameter greater than that of the steering column, a first resilient bushing supported by said recessed portion and having an aperture therein through which said steering column passes, a retainer disposed on an upper surface of said first bushing and having an aperture therein through which said steering column passes, said retainer being composed of two sections to facilitate mounting said retainer about said steering column, each section being detachably secured to said second bracket and having a key adapted for insertion into an aperture in said steering column so as to render said section engageable with said column, said retainer at least substantially surrounding and extending generally radially outwardly from said steering column, a second resilient bushing disposed on an upper surface of said retainer and having an aperture therein through which said steering column passes, and a cap means being detachably secured to said second bracket and having a portion thereof projecting upwardly from said second bracket, said upwardly directed portion substantially surrounding said steering column and engaging said second bushing so as to maintain said second bushing in contact with said steering column, said first and second resilient bushings contacting said steering column in the area where said column passes through said second bracket so as to prevent said column from contacting said second bracket, and said retainer by virtue of being keyed to said column allowing said steering column to swivel within said bracket in a plane extending substantially longitudinal of said passenger compartment while limiting sliding axial motion of said second bracket relative to said steering column during tilting of said steering column.

15. In a vehicle having a frame and a passenger cab compartment supported by said frame and tiltable about a pivot axis located on the forward portion of said frame and extending transversely of the vehicle, a steering column mounted in and movable with said tiltable passenber compartment, and a steering shaft concentrically disposed within said steering column, said shaft to pivot during tilting of said compartment about a transversely extending pivot axis which is located within the passenger compartment to the rear of the pivot axis of said compartment, support means secured to a portion of said compartment, and engaging said steering column, said support means comprising a bracket pivotally connected to and extending outwardly from a portion of said compartment, said bracket having formed therein a downwardly depending recessed portion having an aperture through which said steering column passes of a diameter greater than that of the steering column, a first resilient bushing supported by said recessed portion and having an aperture therein through which said steering column passes, a retainer disposed on the upper surface of said first bushing and having an aperture therein through which said steering column passes, said retainer being composed of two sections to facilitate mounting said retainer about said steering column, each section being detachably secured to said bracket and having a key adapted for insertion into an aperture in said steering column so as to render said section engageable with said column, said retainer substantially surrounding and extending generally radially outwardly from said steering column, a second resilient bushing disposed on an upper surface of said retainer and having an aperture therein through which said steering column passes, and a cap means being detachably secured to said bracket and having a portion thereof projecting upwardly from said bracket, said upwardly directed portion substantially surrounding said steering column and engaging said second bushing so as to maintain said second bushing in contact with said steering column, said first and second resilient bushings contacting said steering column in the area where said column passes through said bracket so as to prevent said column from contacting said bracket, and said retainer means by virtue of being keyed to said column allowing said steering column to swivel within said bracket in a plane extending substantially longitudinally of said passenger compartment while limiting sliding axial motion of said bracket relative to said steering column during tilting of said steering column.

References Cited by the Examiner

UNITED STATES PATENTS

| | | | |
|---|---|---|---|
| 1,483,903 | 2/1924 | Masury | 280—87 |
| 1,707,747 | 5/1929 | Whitten | 280—87 |
| 2,873,979 | 2/1959 | Venditty et al. | 280—87 |
| 2,937,881 | 5/1960 | Norrie | 280—87 |

FOREIGN PATENTS 751,895  10/1952  Germany.

KENNETH H. BETTS, *Primary Examiner.*